E. C. BERRIMAN.
MEASURING INSTRUMENT.
APPLICATION FILED NOV. 29, 1918.
1,435,274.
Patented Nov. 14, 1922.
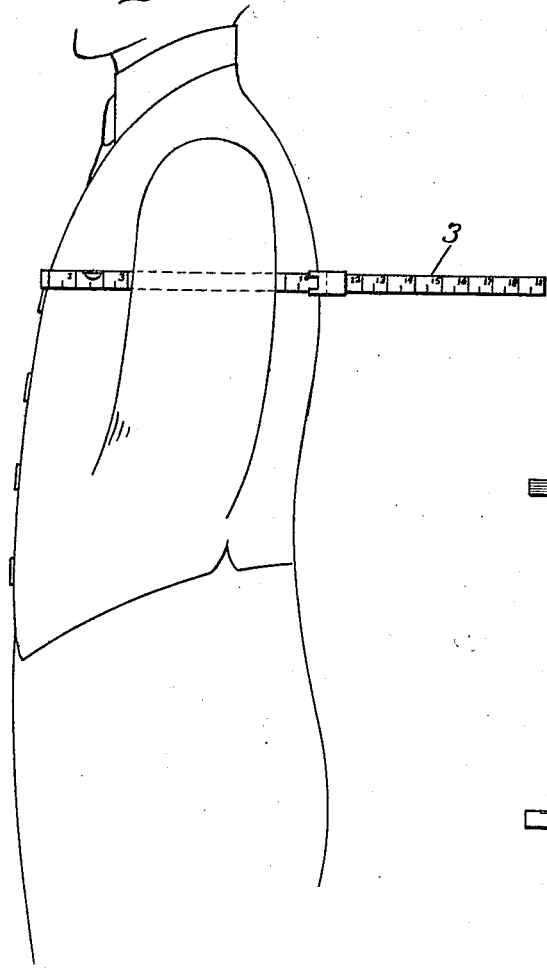
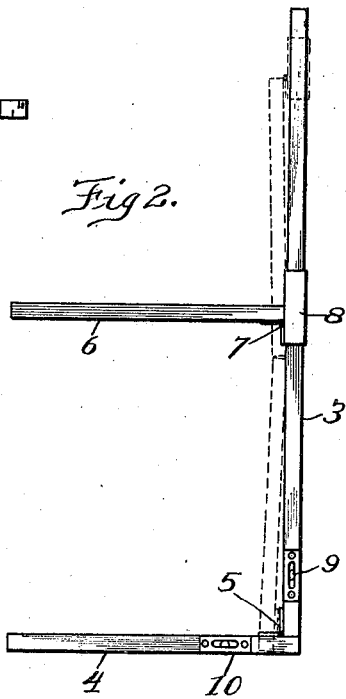

Patented Nov. 14, 1922.

1,435,274

UNITED STATES PATENT OFFICE.

EDWARD C. BERRIMAN, OF CHICAGO, ILLINOIS.

MEASURING INSTRUMENT.

Application filed November 29, 1918. Serial No. 264,506.

*To all whom it may concern:*

Be it known that I, EDWARD C. BERRIMAN, a citizen of the United States, residing at Chicago, in the county of Cook and State of Illinois, have invented certain new and useful Improvements in Measuring Instruments, of which the following is a specification.

It has been demonstrated that if a custom tailor is furnished with the proper measurements of a customer he can build a suit of clothes which will fit the customer as well as if he had presented himself to the tailor in the usual way for measurement and fitting. This is not possible in ordinary tailoring because the tailor depends upon one or more personal fittings to enable him to shape and fit a coat, for example, to the particular characteristics which distinguish each individual and to preserve the proper balance. It is necessary to provide the tailor with additional and more accurate measurements than are ordinarily taken to indicate to the tailor with exactness not only the size and shape of the customer but also those physical characteristics which affect the fit of his clothes and for which the tailor usually depends upon his personal fitting to note.

The object of the present invention is to provide a measuring instrument for accurately determining the points on the customer's chest and back to be used as centers from which measurements should be taken.

In the accompanying drawings—

Fig. 1 illustrates the instrument applied to a figure as in actual use; and

Fig. 2 is a plan view of the instrument.

Referring to the drawings, 3 indicates a straight guide and 4 an end arm which is hinged to the guide by a hinge 5 located on the inner side of the guide 3 and the end arm 4 at the end of the guide and somewhat removed from the end of the end arm so that when the end arm is extended, as shown in Fig. 2, its hinged end will abut against the adjacent end of the guide to hold the end arm rigidly in position at a right angle to the guide. Another arm 6 is connected by a hinge 7 to a slide 8 on the straight guide 3, the arm 6 being arranged on the same side of the guide as the arm 4. The hinge 7 is located at the end of the arm 6 and upon the side of the slide 8 so that when the arm 6 is extended its end will abut against the slide 8 to maintain the arm 6 in rigid position at a right angle to the guide.

The two arms 4 and 6 are adapted to be folded inwardly upon the guide 3, as indicated in Fig. 2, and the combined length of the two arms is less than that of the guide so that the slide 8 will not become disengaged from the guide when the arms are folded and also so that the arms may be folded snugly against the guide with the outer ends of the arms abutting.

This instrument is intended for use in determining the chest center and the back center of a customer's figure so that from these centers measurements may be made which will enable the tailor to accurately determine how to cut a vest and particularly a coat, so that they will properly fit and drape on the customer. It has been found by extensive investigation that such measurements should be made from the hollow beneath the left arm as a starting point, that is to say, I have found that the hollow beneath the left arm is the most universally reliable part of a person's figure from which measurements may be taken to properly and accurately determine the fit and balance of a coat or vest. Therefore, in practice, I arrange the instrument upon a customer in the manner indicated in Fig. 1, with the guide snugly fitting up in the hollow under the left arm, the end arm extending across and pressed firmly against the customer's chest and the sliding arm 6 pressed firmly against the customer's back. For accuracy I provide a spirit level 9 on the guide and a spirit level 10 on the end arm, these levels being located adjacent each other at the hinged ends of the guide and arm in convenient position for observation. With these levels the instrument can be arranged in a horizontal position so that with the arms 4 and 6 as guides horizontal chalk marks may be made across the chest and across the back of the customer. Vertical lines are then drawn freehand through the horizontal lines, by sighting the medial vertical line of the customer, front and back, and the centers formed by these lines will be the chest center and the back center of the customer.

By extended investigations I have found that these centers, as thus determined, will correctly locate the points from which measurements may be taken to provide the proper fit of a coat or a vest and that they may be relied upon for universal use regardless of the great variety of physical characteristics which make accurate measurement absolutely essential.

While I have described the invention as used in a particular manner which I have found to be important in my work it will be apparent that the instrument may be used under the right arm, just as under the left arm, and that the guide may be placed against the chest or the back with the arms 4 and 6 extended under the arms of the customer, if desired, for additional information. I also prefer to provide the guide with calibrations, as shown in Fig. 1, and the arms 4 and 6 with similar calibrations so that measurements may be made showing the dimension of the customer from front to back, the width beneath the arms, and for other purposes.

The arms of the instrument are preferably made of sufficient length to extend across the chest and across the shoulder blades on the back so that the horizontal center marks hereinbefore mentioned may be made by using the arms for chalk guides. It is important in making these marks that the instrument should be level and for this reason I provide the spirit levels on the guide and one arm.

I also use this instrument for determining the centers at the waist line which I find is thickest on a level with the left hip bone. Consequently, I rest the instrument on the hip bone in a level position and make horizontal front and back center marks as before described.

While I have described the instrument as used in making coat measurements I have found that it may be used with equally satisfactory results in making shirts, the procedure being much the same as that herein explained.

I claim:

A measuring instrument comprising a guide member, an end arm hinged to said guide member to swing between positions parallel to and at right angles to said guide member, a slide on said guide member, a second arm hinged to said slide to swing between positions parallel to and at right angles to said guide member, and level devices carried by said guide member and one of said arms.

EDWARD C. BERRIMAN.

Witness:
  M. A. KIDDIE.